United States Patent
Albright

(10) Patent No.: US 11,267,066 B2
(45) Date of Patent: Mar. 8, 2022

(54) WELD SIGNATURE ANALYSIS FOR WELD QUALITY DETERMINATION

(71) Applicant: Lincoln Global, Inc., Santa Fe Springs, CA (US)

(72) Inventor: Matthew A. Albright, Euclid, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 668 days.

(21) Appl. No.: 15/926,216

(22) Filed: Mar. 20, 2018

(65) Prior Publication Data

US 2019/0291200 A1    Sep. 26, 2019

(51) Int. Cl.
| | |
|---|---|
| *B23K 31/02* | (2006.01) |
| *B23K 9/095* | (2006.01) |
| *B23K 9/10* | (2006.01) |
| *B23K 31/12* | (2006.01) |
| *B23K 9/16* | (2006.01) |

(52) U.S. Cl.
CPC ............ *B23K 9/0953* (2013.01); *B23K 9/095* (2013.01); *B23K 9/1062* (2013.01); *B23K 9/16* (2013.01); *B23K 31/02* (2013.01); *B23K 31/12* (2013.01); *B23K 31/125* (2013.01)

(58) Field of Classification Search
CPC ...... B23K 31/02; B23K 31/12; B23K 31/125; B23K 9/095; B23K 9/0953; B23K 9/1062; B23K 9/16
USPC ....... 219/60 R, 61, 61.1–61.5, 121.11–121.3, 219/121.45, 136, 136 R
See application file for complete search history.

(56) References Cited

U.S. PATENT DOCUMENTS

| | | | |
|---|---|---|---|
| 5,306,893 A | 4/1994 | Morris et al. | |
| 5,406,044 A | 4/1995 | Killian et al. | |
| 5,674,415 A | 10/1997 | Leong et al. | |
| 6,236,017 B1 * | 5/2001 | Smartt | B23K 9/093 |
| | | | 219/130.01 |
| 6,329,635 B1 | 12/2001 | Leong et al. | |
| 6,441,342 B1 * | 8/2002 | Hsu | B23K 9/091 |
| | | | 219/130.01 |
| 6,583,386 B1 | 6/2003 | Ivkovich | |
| 9,468,988 B2 | 10/2016 | Daniel | |

(Continued)

FOREIGN PATENT DOCUMENTS

| | | |
|---|---|---|
| DE | 10 2011 077754 A1 | 12/2012 |
| JP | H06341966 A | 12/1994 |

(Continued)

OTHER PUBLICATIONS

Extended European Search Report from Corresponding Application No. EP 19163800.6; dated Aug. 12, 2019; pp. 1-33.

(Continued)

*Primary Examiner* — Sang Y Paik
(74) *Attorney, Agent, or Firm* — Brad C. Spencer

(57) ABSTRACT

A method of determining weld quality includes the step of providing a reference weld signature having a first shape. A weld signature of a welding parameter is captured, wherein the weld signature of the welding parameter has a second shape. The first shape is automatically compared to the second shape and a weld signature shape difference between the first shape and the second shape is determined. A weld fault condition is determined based on the weld signature shape difference.

21 Claims, 5 Drawing Sheets

(56) References Cited

U.S. PATENT DOCUMENTS

| | | | |
|---|---|---|---|
| 2003/0234239 A1* | 12/2003 | Lee | B23K 11/24 |
| | | | 219/109 |
| 2004/0182828 A1 | 9/2004 | Schmidt et al. | |
| 2007/0000880 A1* | 1/2007 | Lambert | B23K 9/095 |
| | | | 219/121.46 |
| 2008/0078812 A1* | 4/2008 | Peters | B23K 9/0956 |
| | | | 228/101 |
| 2009/0200282 A1 | 8/2009 | Hampton | |
| 2014/0042137 A1* | 2/2014 | Daniel | G05B 19/4183 |
| | | | 219/130.5 |
| 2017/0072496 A1 | 3/2017 | Falde et al. | |
| 2017/0072497 A1 | 3/2017 | Ivkovich | |

FOREIGN PATENT DOCUMENTS

| | | | |
|---|---|---|---|
| JP | 2001 321949 A | 11/2001 | |
| JP | 4486407 B2 | 6/2010 | |
| WO | 2008/142386 A1 | 11/2008 | |
| WO | 2017/048747 A1 | 3/2017 | |
| WO | 2017/048751 A1 | 3/2017 | |

OTHER PUBLICATIONS

Simpson; "Signature Images for arc welding fault detection"; Journal Science and Technology of Welding and Joining; vol. 12, 2007—Issue 6; Published Online Dec. 4, 2013; pp. 481-486.

Simpson; "Fault identification in gas metal arc welding with signature images"; Journal Science and Technology of Welding and Joining; vol. 13, 2008—Issue 1; Published Online Dec. 4, 2013; pp. 87-96.

Shannon; "Gaining control of resistance welding"; The Fabricator; Aug. 8, 2007; pp. 1-6.

* cited by examiner

WELD SIGNATURE ANALYSIS FOR WELD QUALITY DETERMINATION

BACKGROUND OF THE INVENTION

Field of the Invention

The present disclosure relates to determining the quality of welds, and in particular to a weld signature shape-based approach to determining the quality of welds.

Description of Related Art

Welding parameters such as voltage and current are monitored during a welding operation, and can be used to determine the quality of a resulting weld. The value of one or more parameters can be compared to acceptable levels for the parameter, to determine whether or not the weld passes or fails. More sophisticated techniques for determining weld quality involve measuring multiple weld parameters and calculating multiple quality parameters in order to generate an overall weld score, which quantifies the overall quality of the weld. Such a technique is disclosed in U.S. Pat. No. 9,468,988 to Daniel, which is incorporated herein by reference.

A problem with parameter value-based weld quality or fault analysis routines, such as those discussed above, is that they may require a welding parameter to reach a generally steady state in order to accurately characterize the parameter as acceptable or not. For welds of very short duration (e.g., less than 1 second), the parameter may never reach an appropriate steady state and, thus, automated methods of weld quality determination may be inaccurate or unable to properly characterize the weld. It would be desirable to automatically determine the weld quality of such short duration welds in a manner that is largely unaffected by the instability in the monitored welding parameters.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a method of determining weld quality. The method includes the step of providing a reference weld signature having a first shape. A weld signature of a welding parameter is captured, wherein the weld signature of the welding parameter has a second shape. The first shape is automatically compared to the second shape and a weld signature shape difference between the first shape and the second shape is determined. A weld fault condition is determined based on the weld signature shape difference.

In accordance with another aspect of the present invention, provided is a non-transitory, computer-readable storage medium having stored thereon computer-executable instructions that, when executed, configure a processor to retrieve a reference weld signature having a first shape. The instructions further configure the processor to obtain a weld signature of a weld bead parameter, wherein the weld signature of the weld bead parameter has a second shape. The instructions further configure the processor to compare the first shape to the second shape and determine a weld signature shape difference between the first shape and the second shape, and to determine a weld fault condition based on the weld signature shape difference.

In accordance with another aspect, provided is a method of determining weld quality. The method includes the step of providing a fault analysis duration threshold. A weld signature of a weld bead is obtained, wherein the weld signature has a shape. A welding duration of the weld bead is determined. The welding duration of the weld bead is compared to the fault analysis duration threshold. When the welding duration for the weld bead is greater than the fault analysis duration threshold, a parameter value-based fault analysis routine including comparing at least one welding parameter value to a predetermined limit value is performed. When the welding duration for the weld bead is less than the fault analysis duration threshold, a signature shape-based fault analysis routine including comparing the shape of the weld signature to a reference weld signature shape is performed.

DETAILED DESCRIPTION OF THE INVENTION

Figure 1:
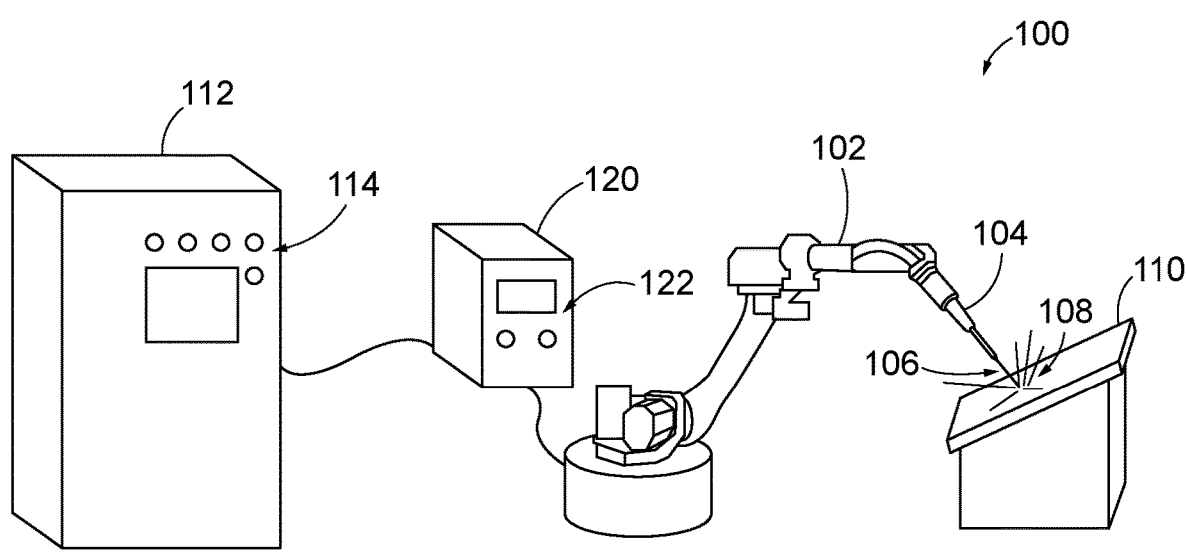
FIG. 1 is an example electric arc generation system.

Embodiments of the present disclosure relate to systems and methods for determining the quality of welds. The embodiments will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

FIG. 1 shows an example welding system 100. The example welding system 100 includes a robot 102 that operates an electric arc torch 104 (e.g., an arc welding torch). However, the welding system 100 need not include a robot 102 and could be a manual welding system in which the electric arc torch 104 is operated by a person. The robot 102 can be a six-axis articulating industrial robot, or another type of robot, such as an orbital pipe welder for example.

For ease of explanation, aspects of the system 100 will be discussed in the context of an electric arc welding system employing an arc welding torch. However, it is to be appreciated that such aspects are also applicable to other types of arc metal deposition systems, such as an additive manufacturing system for example. Moreover, the system 100 is not limited to a particular welding process and could be used to perform various welding processes, such as gas tungsten arc welding (GTAW), gas metal arc welding (GMAW), flux-cored arc welding (FCAW), stick welding (SMAW), or submerged arc welding (SAW).

The torch 104 can include an electrode 106, such as a consumable wire electrode, through which an arc 108 is generated between the torch and a workpiece 110 to perform a welding operation on the workpiece. The robot 102 controls the movements of the torch 104 during welding to perform a programmed welding operation on the workpiece 110. The programmed welding operation can include the welding of a plurality of weld beads of varying duration.

The system 100 includes a power supply 120. The power supply 120 provides an electrical power output to the torch 104 to generate the arc 108. The power supply 120 converts input electrical power (e.g., utility power) into a suitable arc waveform (e.g., a welding waveform) for performing a welding operation on the workpiece 110. The power supply 120 can include electronic circuitry (e.g., PWM inverters, choppers, etc.) for generating a desired arc waveform. The power supply 120 can further include a processor, memory, and a user interface 122 for adjusting various parameters of the operation performed on the workpiece 110 (e.g., voltage, current, wire feed speed, AC balance, etc.) and for controlling the welding waveform during welding.

The system 100 further includes a computing device 112 that can determine the quality of welds performed by the system. The computing device 112 has a user interface 114 for allowing a user to view information regarding the quality of welds performed on a current workpiece 110 or historical information regarding the quality of welds made on previously-welded workpieces. The computing device 112 can also output or transmit information regarding the quality of welds to a remote device (not shown), such as a remote computing device or human-machine interface, an alarm system, a mobile communication device, etc., via a local or wide area network.

The power supply 120 monitors various welding parameters, such as welding voltage, current, wire feed speed, etc., during a welding operation and transmits the welding parameters to the computing device 112 via a wired or wireless communication link. In certain embodiments, the communication of welding parameters to the computing device 112 can occur in real-time, so that an operator can be alerted to faulty welds as they occur. The computing device 112 processes one or more of the welding parameters to capture a weld signature and determine a weld fault condition based on the weld signature. The computing device 112 may also obtain the weld signature from the power supply 120. In certain embodiments, the computing device 112 can make adjustments to settings of the power supply 120 based on the quality of welds made by the system 110. As will be explained below, the computing device 112 can perform either a parameter value-based fault analysis routine (e.g., comparing at least one welding parameter value to a predetermined limit value) and/or a signature shape-based fault analysis routine (e.g., comparing the shape of a weld signature of a welding parameter to a reference weld signature shape).

Parameter value-based weld quality or fault analysis routines may require the parameter at issue to reach a generally steady state in order to accurately characterize the parameter, and the resulting weld, as acceptable or not. For welds of very short duration (e.g., less than 1 second), the parameter may never reach an appropriate steady state and, thus, parameter value-based weld quality analysis routines may be inaccurate or unable to properly characterize the weld as acceptable or unacceptable.

Figure 2:
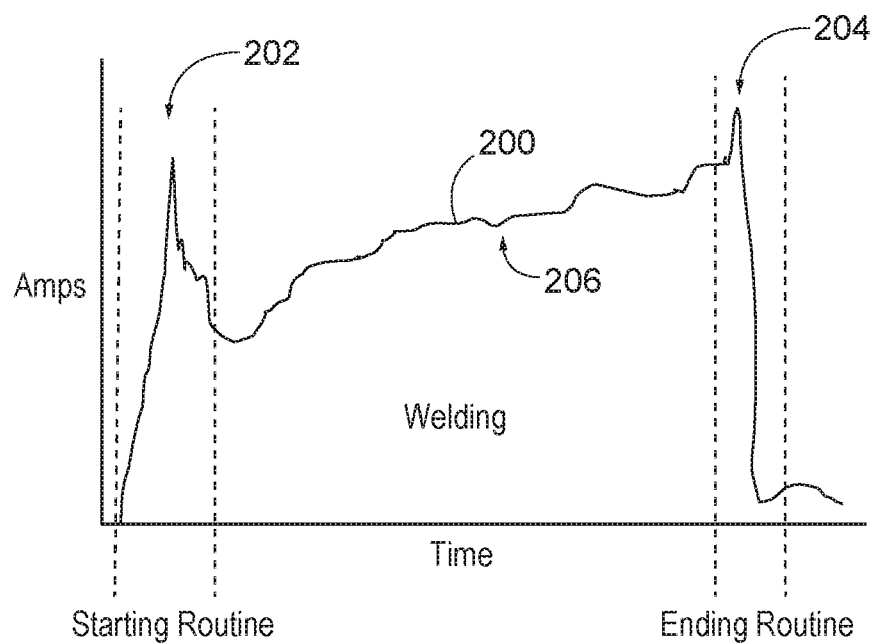
FIG. 2 is a waveform.

An example of an "unstable" welding parameter that may indicate an acceptable weld, but would not be appropriate for a parameter value-based weld quality analysis routine, is shown in FIG. 2. FIG. 2 depicts an example weld signature 200 of welding current during welding of a weld bead. Although a weld current signature is shown in FIG. 2, the weld signature 200 is intended to illustrate of any number of various welding parameters that could be used in a weld signature shape-based fault analysis routine. The weld signature 200 has three states: a starting routine 202, and ending routine 204 and a welding portion 206. It can be seen that the welding current increases during the welding portion and does not reach a generally steady state. A parameter value-based weld quality analysis routine would typically discard the starting routine 202 and the ending routine 204 due to the clear instability in the parameter's value during these portions, and analyze the value (e.g., average current, median current, etc.) of only the welding portion 206. However, if the duration of the welding portion 206 is short, and the parameter does not reach a generally steady state as shown, it can be difficult to accurately determine a deviation of the parameter from a predetermined "normal" limit value or range of limit values. For example, if the range of acceptable limit values is made large to accommodate the instability of the welding portion 206, then there will be an increased chance that unacceptable welds (e.g., due to unwanted shorting of the welding electrode to the workpiece) are captured within the large range, in addition to acceptable welds. Conversely, if the range of acceptable limit values for the parameter is made small, then there will be an increased chance that some acceptable welds will be flagged as faulty, because the welding parameter is unstable and difficult to properly characterize.

For welds of any duration, but in particular welds of short duration when the welding portion 206 is less than 1 second for example, acceptable welds and weld fault conditions can be determined by using a signature shape-based fault analysis routine. In a signature shape-based fault analysis routine, a reference weld signature is provided by the computing device 112 (FIG. 1) for comparison to the captured weld signature, and the shape of the weld signature is compared to the reference weld signature shape to determine a weld signature shape difference between the two. The weld signature shape difference is a degree of difference between the reference shape and the shape of the captured weld signature. A weld fault condition or an acceptable weld is then determined based on the weld signature shape difference.

Figure 3:
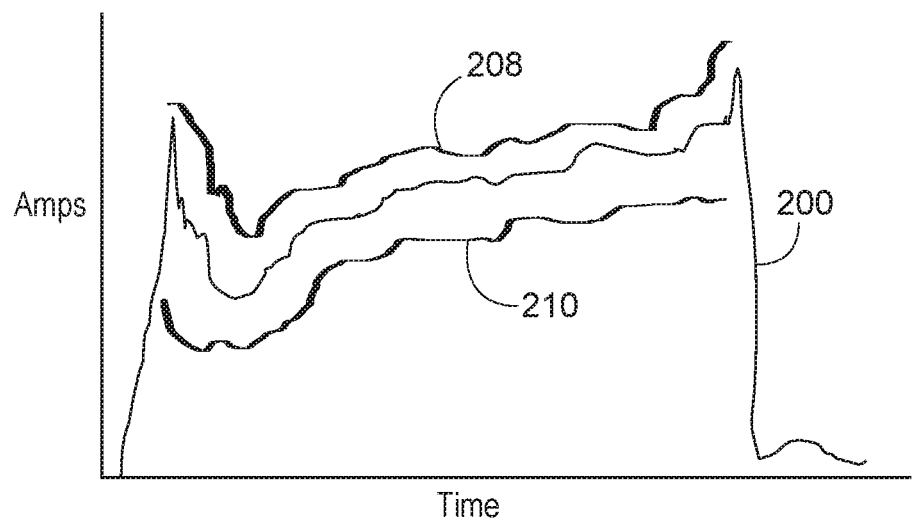
FIG. 3 shows multiple waveforms.

Example reference weld signatures 208, 210 are shown in FIG. 3 above and below a captured weld signature 200. Reference weld signatures can be stored in the computing device 112 (FIG. 1) for retrieval and use during a signature shape-based fault analysis routine. In certain embodiments, the computing device 112 can learn reference weld signatures by employing machine learning techniques and pattern recognition with respect to known good and known faulty weld signatures as training data.

The computing device 112 (FIG. 1) automatically compares the shape of the captured weld signature 200 to the shape of one or more reference weld signatures 208, 210 to determine the weld signature shape difference. It may be necessary to identify key features in the weld signature 200, such as the beginning or end of the welding portion, so that it can be aligned with corresponding portions of the reference weld signature(s). Once aligned, a plurality of points along the weld signature 200 and reference weld signature(s) can be compared to determine a plurality of shape differences, which could be magnitude differences, slope differences, differences between the second derivatives, and the like. The duration of certain portions of the weld signature 200 and reference weld signature(s) can also be compared as part of comparing their shapes. For example, the duration of the current dips at the end of the starting routines can be compared, or the duration of the welding portions can be compared. Particular features can also be identified in the weld signature 200 and used to define or describe the weld signature, such by way of a corresponding code. The code can be compared to a similar code for the reference weld signature(s) to determine the weld signature shape difference. Further, determining whether or not the shape of the weld signature 200 adequately matches the shape reference weld signature(s) can involve techniques similar to biometric identification, in which a matching score is generated based on the similarities/differences between the shapes. When the matching score is higher than a predetermined threshold or the weld signature shape difference is less than a predetermined limit, the weld will be treated as passing. When the matching score is less than the threshold or the weld signature shape difference exceeds a predetermined limit, a weld fault condition is determined to exist. Also, the shape characteristics of particular portions of the weld signature can be weighed more heavily than other portions of the weld signature. For example, the slope of the welding current from a peak during the starting routine 202 (FIG. 2) to its minimum value during the welding portion 206 could be more important with respect to determining weld quality than the shape of the weld signature during the ending routine 204. Thus, the shape of the weld signature 200 during the ending routine could be considered (i.e., not excluded) in the shape comparison, but weighed less heavily than other, more informative portions of the welding signature. Various methods of shape comparison can be performed in determining the existence of a weld fault condition, as would be appreciated by one of ordinary skill in the art.

The signature shape-based fault analysis routine can include analyzing the shape of multiple welding parameters captured during the welding of a weld bead (e.g., welding voltage, current, wire feed speed, etc.) The shape differences between the captured weld signatures and reference weld signatures can be considered together to determine an overall shape difference, which then is used to determine whether or not a weld fault condition exists. For example, the shape differences can be added or averaged to determine an overall shape difference. In certain embodiments, the captured weld signatures of different parameters are compared individually to corresponding reference weld signatures. Alternatively, the monitored welding parameters can be combined to form a multi-dimensional weld signature, and the shape of the multi-dimensional weld signature can be compared to a multi-dimensional reference weld signature.

The signature shape-based fault analysis routine can further include comparing the weld signature 200 to upper and/or lower boundary reference weld signatures. Example upper 208 and lower 210 boundary reference weld signatures are shown in FIG. 3. The upper 208 and lower 210 boundary reference weld signatures can have a shape or profile similar to the captured weld signature 200 for shape comparison with the weld signature. If a portion of the captured weld signature 200 exceeds one of the boundary reference weld signatures 208, 210, a weld fault can be determined to exist. That is, if a portion of the captured weld signature 200 is outside of the signature window provided by the upper 208 and lower 210 boundaries (e.g., either above the upper 208 boundary or below the lower 210 boundary), a weld fault is determined to exist. Determination of the weld fault condition can be based on both of an analysis of the weld signature shape difference between the captured weld signature 200 and the reference weld signature(s) 208, 210 and the comparison of the weld signature to one or both of the upper 208 and lower 210 boundaries. Either of the shape difference or boundary tests can lead to the determination that a faulty weld has been made. For example, a captured weld signature that remains between the upper 208 and lower 210 boundaries but has a substantially different shape from the reference weld signature(s) could be considered to be faulty. Similarly, a captured weld signature that is shaped very similarly to the reference weld signature(s) but exceeds either the upper 208 or lower 210 boundaries could also be considered to be faulty, even if it would pass a purely shape-based fault analysis.

In certain embodiments, weld signature shape-based weld fault analysis routines can be combined with weld parameter value-based weld fault analysis routines. Such an approach can be useful when welds of varying duration are performed on a workpiece, with some welds being sufficiently long for a parameter value-based fault analysis routine to accurately determine weld quality, and some welds being too short for a parameter value-based fault analysis routine. The computing device 112 (FIG. 1) can determine a welding duration for a particular weld bead. The welding duration can be calculated from the entire weld bead (e.g., from starting routine 202 to the ending routine 204) or from just the welding portion 206 (FIG. 2), since the starting routine and ending routine are often discarded in the parameter value-based fault analysis routine. The computing device 112 can retrieve a stored fault analysis duration threshold (e.g., 2 seconds, 1 second, 500 ms, etc.). The welding duration is then compared to the fault analysis duration threshold, and either the signature shape-based weld fault analysis routine and the parameter value-based weld fault analysis routine is selected, based on the result of the comparison. For example, when the welding duration (e.g., the duration of the welding portion 206) is less than the fault analysis duration threshold, the weld signature shape-based fault analysis is performed. When the welding duration is greater than the fault analysis duration threshold, the parameter value-based fault analysis is performed. In the parameter value-based fault analysis routine, a parameter value (e.g., average value, median value, peak value, minimum value, RMS value, etc.) of one or more welding parameters can be compared to predetermined limit values or ranges of values (acceptable parameter levels) to determine whether or not a faulty weld has been made. Parameter value-based fault analysis can also involve calculating an overall weld score for the weld bead, as discussed above. Weld signature shape-based fault analysis and parameter value-based fault analysis can also be combined when the welding duration allows for parameter value-based fault analysis. For example, if an average parameter value is within an acceptable range of values, but the weld signature shape deviates excessively from a reference weld signature, a weld fault condition can be determined.

Figure 4:
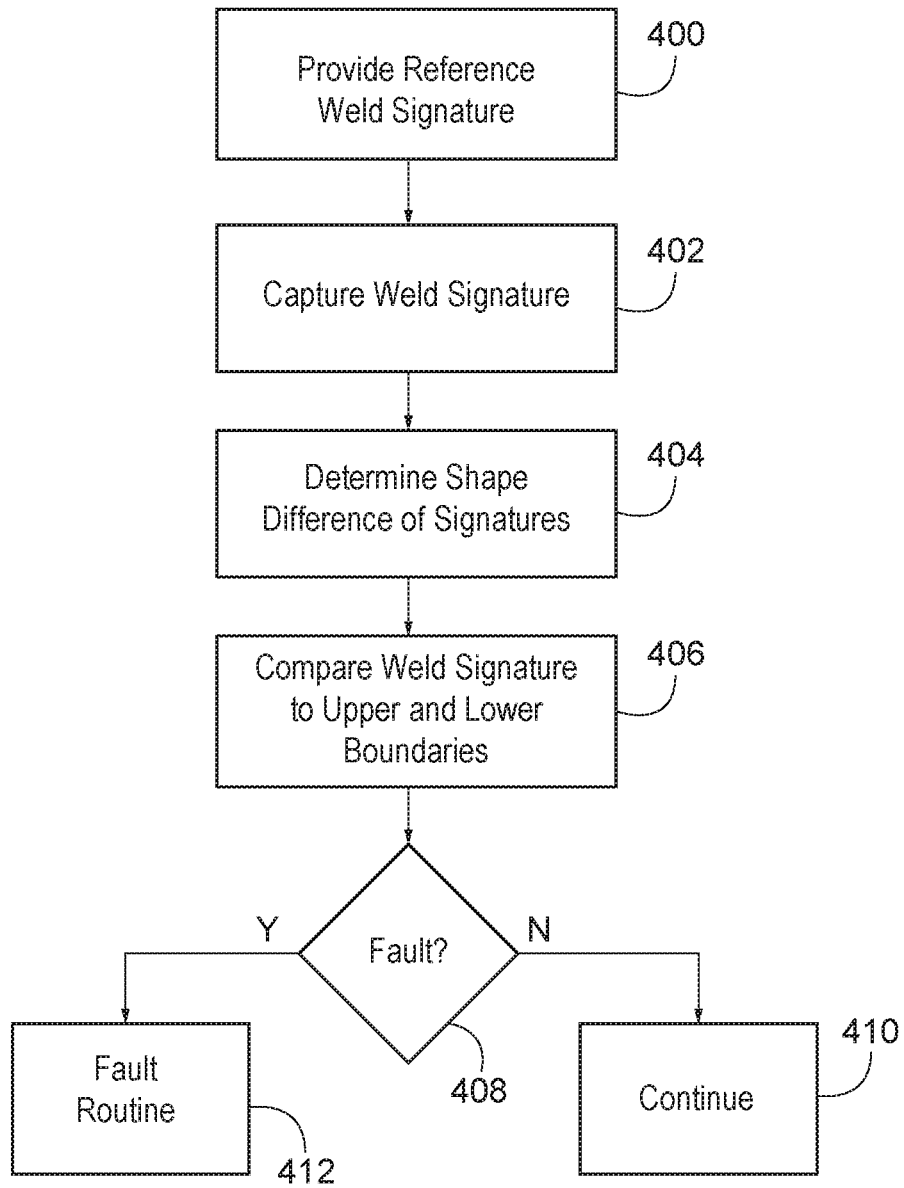
FIG. 4 is a flow diagram.
Figure 5:
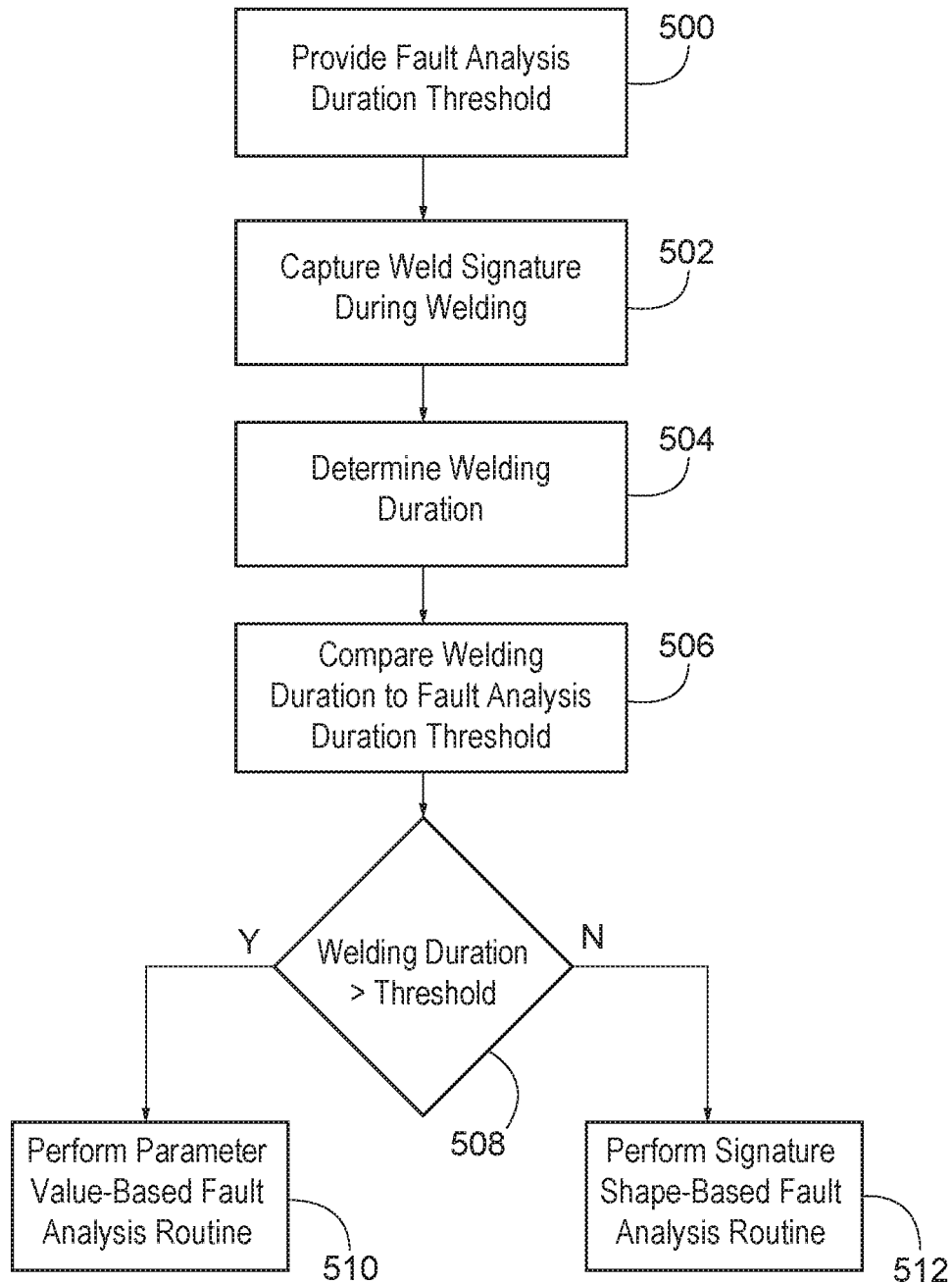
FIG. 5 is a flow diagram.

Turning now to FIGS. 4 and 5, methodologies are described in connection with the illustrated flow diagrams. The methodologies described can be performed by the computing device 112, or the power supply 120 (FIG. 1) if desired. Referring to FIG. 4, illustrated is a flow diagram of a method for determining weld quality. At 400, a reference weld signature is provided, such as retrieved from a memory device. At 402, a weld signature of a welding parameter is captured. At 404, the shape of the reference weld signature is compared to the shape of the captured weld signature, and one or more shape differences between the reference weld signature and the shape of the captured weld signature is determined. At 406, the captured weld signature is compared to upper and lower boundaries. At 408 a determination is made as to whether or not a fault weld has occurred. The determination can be based on the one or more shape differences between the reference weld signature and the shape of the captured weld signature, and/or based on comparing the captured weld signature to the upper and lower boundaries. If no weld fault condition has occurred, the welding operation can continue normally 410. If a weld fault condition has occurred, then a fault routine can be initiated 412. The fault routine can include flagging the weld bead as faulty, generating an alarm, sending a message to a predetermined person or device, stopping the welding process, etc.

A further methodology for determining weld quality is illustrated in the flow diagram of FIG. 5. At 500, a fault analysis duration threshold is provided, such as retrieved from a memory device. At 502, a weld signature of a weld bead is captured. At 504, a welding duration of the weld bead is determined. At 506, the welding duration of the weld bead is compared to the fault analysis duration threshold. At 508, a determination is made as to whether or not the welding duration is greater than the fault analysis duration threshold. When the welding duration for the weld bead is greater than the fault analysis duration threshold, a parameter value-based fault analysis routine is performed, which can include comparing at least one welding parameter value to a predetermined limit value 510. When the welding duration for the weld bead is less than the fault analysis duration threshold, a signature shape-based fault analysis routine is performed, which can include comparing the shape of the weld signature to a reference weld signature shape 512.

Figure 6:
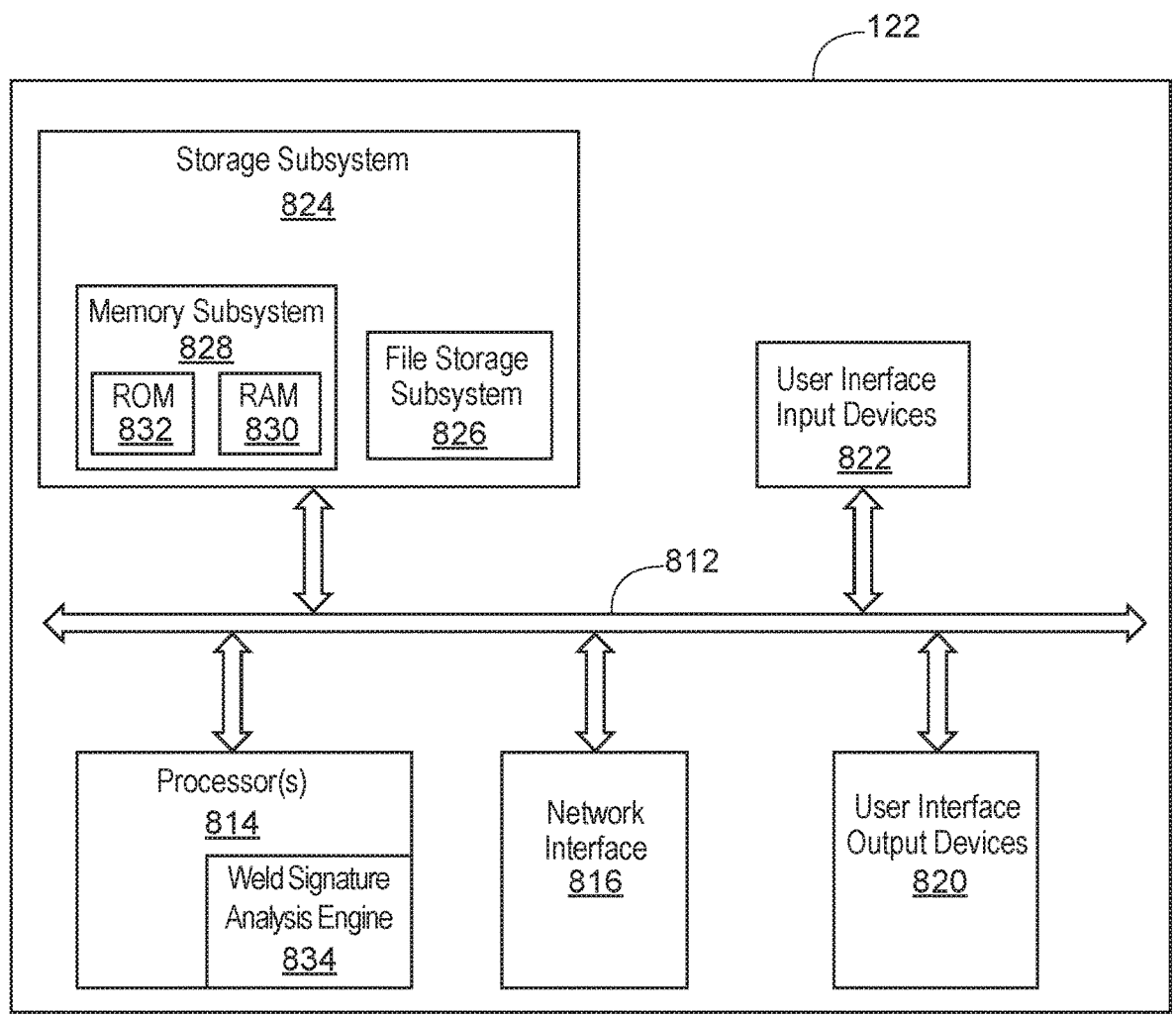
FIG. 6 is a schematic diagram of an example computing device.

FIG. 6 illustrates an example embodiment of computing device 112 (FIG. 1). The computing device 112 includes at least one processor 814 which communicates with a number of peripheral devices via bus subsystem 812. These peripheral devices may include a storage subsystem 824, including, for example, a memory subsystem 828 and a file storage subsystem 826, user interface input devices 822, user interface output devices 820, and a network interface subsystem 816. The input and output devices allow user interaction with the computing device 112. Network interface subsystem 816 provides an interface to outside networks and can be coupled to corresponding interface devices in other computer systems or programmable devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the computing device 112 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the computing device 112 to the user or to another machine or computer system.

Storage subsystem 824 provides a non-transitory, computer-readable storage medium that stores programming and data constructs that provide the functionality of some or all of the operations described herein. For example, the storage subsystem 824 may include programming instructions to allow the computing device 112 to execute the weld quality analysis routines described above.

Firmware or software modules having the programming instructions are generally executed by processor 814 alone or in combination with other processors. Memory subsystem 828 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 826 in the storage subsystem 824, or in other machines accessible by the processor(s) 814.

Bus subsystem 812 provides a mechanism for letting the various components and subsystems of the computing device 112 communicate with each other as intended. Although bus subsystem 812 is shown schematically as a single bus, alternative embodiments of the bus subsystem may use multiple buses.

The programming instructions stored in the memory subsystem 824 and executed by the processor 814 can cause the processor to implement or include a weld signature analysis engine 834. The weld signature analysis engine 834 can perform the various methods of determining weld quality discussed above.

In certain embodiments, the computing device 112 can be part of a robot controller that provides control instructions to the robot 102 to control its movements during welding (FIG. 1).

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method of determining weld quality, comprising the steps of:
   providing a reference weld signature having a first shape;
   capturing a weld signature of a welding parameter, wherein the weld signature of the welding parameter has a second shape;
   determining a welding duration from the weld signature of the welding parameter;
   comparing the welding duration to a fault analysis duration threshold;
   when the welding duration is greater than the fault analysis duration threshold, performing a parameter value-based fault analysis routine including comparing at least one welding parameter value to a predetermined limit value; and when the welding duration is less than the fault analysis duration threshold, performing a signature shape-based fault analysis routine including automatically comparing the first shape to the second shape and determining a weld signature shape difference between the first shape and the second shape, and determining a weld fault condition based on the weld signature shape difference.

2. The method of claim 1, wherein the welding parameter includes a plurality of welding parameters, and the second shape is based on each of the plurality of welding parameters.

3. The method of claim 1, wherein the step of automatically comparing the first shape to the second shape and determining a weld signature shape difference includes determining a plurality of shape differences between the first shape and the second shape.

4. The method of claim 1, further comprising the step of comparing the weld signature of the welding parameter to at least one of an upper boundary and a lower boundary, wherein determination of the weld fault condition is based on both of the weld signature shape difference and a result of said step of comparing the weld signature of the welding parameter to the at least one of the upper boundary and the lower boundary.

5. The method of claim 4, wherein the weld fault condition is determined to exist when a portion of the weld signature of the welding parameter exceeds the at least one of the upper boundary and the lower boundary.

6. The method of claim 1, further comprising the step of comparing the weld signature of the welding parameter to both of an upper boundary and a lower boundary, wherein determination of the weld fault condition is based on both of the weld signature shape difference and a result of said step of comparing the weld signature of the welding parameter to both of the upper boundary and the lower boundary.

7. The method of claim 6, wherein the weld fault condition is determined to exist when either the weld signature shape difference exceeds a predefined limit or when a portion of the weld signature of the welding parameter exceeds the upper boundary or the lower boundary.

8. The method of claim 1, further comprising the steps of:
monitoring the welding parameter by a welding power supply while welding a weld bead; and
transmitting the monitored welding parameter to a computing device,
wherein the computing device performs the steps of automatically comparing the first shape to the second shape and determining the weld signature shape difference between the first shape and the second shape, and determining the weld fault condition based on the weld signature shape difference.

9. The method of claim 1, further comprising the steps of:
identifying features in the weld signature of the welding parameter; and
based on the identified features in the weld signature of the welding parameter and before performing said step of automatically comparing the first shape to the second shape, aligning the weld signature of the welding parameter with the reference weld signature.

10. A non-transitory, computer-readable storage medium having stored thereon computer-executable instructions that, when executed, configure a processor to:

retrieve a reference weld signature having a first shape;
obtain a weld signature of a weld bead parameter, wherein the weld signature of the weld bead parameter has a second shape;
determine a welding duration of a weld bead;
compare the welding duration of the weld bead to a fault analysis duration threshold;
select one of a weld signature shape-based weld fault analysis routine and a weld parameter value-based weld fault analysis routine based on a result of comparing the welding duration of the weld bead to the fault analysis duration threshold, wherein
when the welding duration of the weld bead is greater than the fault analysis duration threshold, perform the weld parameter value-based fault analysis routine including comparing at least one welding parameter value to a predetermined limit value; and
when the welding duration of the weld bead is less than the fault analysis duration threshold, perform the weld signature shape-based weld fault analysis routine including comparing the first shape to the second shape and determining a weld signature shape difference between the first shape and the second shape, and determining a weld fault condition based on the weld signature shape difference.

11. The non-transitory, computer-readable storage medium of claim 10, wherein the weld bead parameter includes a plurality of welding parameters, and the second shape is based on each of the plurality of welding parameters.

12. The non-transitory, computer-readable storage medium of claim 10, further storing instructions that configure the processor to:
compare the weld signature of the weld bead parameter to at least one of an upper boundary and a lower boundary, and
determine the weld fault condition based on both of the weld signature shape difference and a result of comparing the weld signature of the weld bead parameter to the at least one of the upper boundary and the lower boundary.

13. The non-transitory, computer-readable storage medium of claim 12, wherein the weld fault condition is determined to exist when a portion of the weld signature of the weld bead parameter exceeds the at least one of the upper boundary and the lower boundary.

14. The non-transitory, computer-readable storage medium of claim 10, further storing instructions that configure the processor to:
compare the weld signature of the weld bead parameter to both of an upper boundary and a lower boundary, and
determine the weld fault condition based on both of the weld signature shape difference and a result of comparing the weld signature of the weld bead parameter to both of the upper boundary and the lower boundary, wherein the weld fault condition is determined to exist when either the weld signature shape difference exceeds a predefined limit or when a portion of the weld signature of the weld bead parameter exceeds the upper boundary or the lower boundary.

15. The non-transitory, computer-readable storage medium of claim 10, further storing instructions that configure the processor to:
identify features in the weld signature of the weld bead parameter; and
based on the identified features in the weld signature of the weld bead parameter and before comparing the first shape to the second shape and determining the weld signature shape difference between the first shape and the second shape, aligning the weld signature of the weld bead parameter with the reference weld signature.

16. A method of determining weld quality, comprising the steps of:
providing a fault analysis duration threshold;
obtaining a weld signature of a weld bead, wherein the weld signature has a shape;
determining a welding duration of the weld bead;
comparing the welding duration of the weld bead to the fault analysis duration threshold;
when the welding duration of the weld bead is greater than the fault analysis duration threshold, performing a parameter value-based fault analysis routine including comparing at least one welding parameter value to a predetermined limit value; and
when the welding duration of the weld bead is less than the fault analysis duration threshold, performing a signature shape-based fault analysis routine including comparing the shape of the weld signature to a reference weld signature shape,
wherein the signature shape-based fault analysis routine further comprises the steps of determining a weld signature shape difference between the shape of the weld signature and the reference weld signature shape, and determining a weld fault condition based on the weld signature shape difference.

17. The method of claim 16, further comprising the steps of:
monitoring a welding parameter by a welding power supply while welding the weld bead; and
transmitting the monitored welding parameter to a computing device,
wherein the computing device performs the step of comparing the welding duration of the weld bead to the fault analysis duration threshold, and performs one of the parameter value-based fault analysis routine and the signature shape-based fault analysis routine for the weld bead.

18. The method of claim 16, wherein the signature shape-based fault analysis routine further comprises the steps of:
comparing the weld signature to at least one of an upper boundary and a lower boundary, and
determining a weld fault condition based on both of the weld signature shape difference and a result of comparing the weld signature to the at least one of the upper boundary and the lower boundary.

19. The method of claim 18, wherein the weld fault condition is determined to exist when a portion of the weld signature exceeds the at least one of the upper boundary and the lower boundary.

20. The method of claim 16, wherein the signature shape-based fault analysis routine further comprises the steps of:
comparing the weld signature to both of an upper boundary and a lower boundary, and
determining a weld fault condition based on both of the weld signature shape difference and a result of comparing the weld signature to both of the upper boundary and the lower boundary, wherein the weld fault condition is determined to exist when either the weld signature shape difference exceeds a predefined limit or when a portion of the weld signature exceeds the upper boundary or the lower boundary.

21. The method of claim 16, wherein the signature shape-based fault analysis routine further comprises the steps of:
identifying features in the weld signature; and
based on the identified features in the weld signature and before performing said step of comparing the shape of the weld signature to the reference weld signature shape, aligning the weld signature with a reference weld signature having the reference weld signature shape.

* * * * *